United States Patent
Chakraborty et al.

(10) Patent No.: US 8,839,166 B1
(45) Date of Patent: Sep. 16, 2014

(54) METHOD AND APPARATUS FOR UNIFIED OUT-OF-CONTEXT FLOW AND AUTOMATION FOR IP REUSE AND HIERARCHICAL DESIGN FLOWS

(71) Applicant: Xilinx, Inc., San Jose, CA (US)

(72) Inventors: Sudipto Chakraborty, Longmont, CO (US); David A. Knol, Morgan Hill, CA (US); Stephen P. Rozum, Loveland, CO (US); Ryan A. Linderman, Longmont, CO (US); Derrick S. Woods, Loveland, CO (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/837,234

(22) Filed: Mar. 15, 2013

(51) Int. Cl.
*G06F 17/50* (2006.01)

(52) U.S. Cl.
CPC ................... *G06F 17/5054* (2013.01)
USPC ............ 716/106; 716/104; 716/111; 716/136

(58) Field of Classification Search
USPC .................. 716/104, 106, 111, 136
See application file for complete search history.

(56) References Cited

U.S. PATENT DOCUMENTS

| | | | | |
|---|---|---|---|---|
| 6,427,223 | B1* | 7/2002 | Kim et al. | 324/762.02 |
| 6,625,781 | B2* | 9/2003 | Roethig et al. | 716/109 |
| 7,395,131 | B2* | 7/2008 | Funk | 700/108 |
| 7,490,312 | B1* | 2/2009 | Ochotta et al. | 716/125 |
| 7,500,060 | B1* | 3/2009 | Anderson et al. | 711/132 |
| 7,523,424 | B2* | 4/2009 | Kolpekwar et al. | 716/103 |
| 7,530,046 | B1* | 5/2009 | Nixon et al. | 716/103 |
| 7,620,927 | B1* | 11/2009 | Ochotta et al. | 716/105 |
| 7,735,036 | B2* | 6/2010 | Dennison et al. | 716/106 |
| 7,987,440 | B2* | 7/2011 | Kalafala et al. | 716/108 |
| 8,225,259 | B1* | 7/2012 | Mendel et al. | 716/116 |
| 8,239,798 | B1* | 8/2012 | Goyal et al. | 716/113 |
| 2005/0114818 | A1* | 5/2005 | Khakzadi et al. | 716/11 |

\* cited by examiner

*Primary Examiner* — Naum Levin
(74) *Attorney, Agent, or Firm* — Kin-Wah Tong; Kevin T. Cuenot (57) ABSTRACT

A method, non-transitory computer readable medium and apparatus for using an out-of-context sub-block in a hierarchical design flow for an integrated circuit are disclosed. For example, the method identifies one or more sub-blocks in the hierarchical design flow that are eligible for creating the out-of-context sub-block, receives a selection of one of the one or more sub-blocks that are eligible and creates the out-of-context sub-block for the one of the one or more sub-blocks that is selected.

20 Claims, 4 Drawing Sheets

METHOD AND APPARATUS FOR UNIFIED OUT-OF-CONTEXT FLOW AND AUTOMATION FOR IP REUSE AND HIERARCHICAL DESIGN FLOWS

FIELD OF THE INVENTION

The present disclosure relates generally to integrated circuit designs, e.g., field programmable gate array designs and, more particularly, to a method and apparatus for a unified out-of-context flow and automation for Intellectual Property (IP) reuse and hierarchical design flows.

BACKGROUND OF THE INVENTION

Designing integrated circuits (ICs), e.g., field programmable gate arrays (FPGAs), is a complicated tasks. Many times, a logical design for the ICs or FPGAs may be very large in scope that may include many sub-level designs.

Current methodologies for IP reuse and hierarchical design flows rely on a significant number of manual steps and advanced knowledge of the design tools and various internal flows. In addition, a detailed understanding of the entire design is required to be able to successfully complete these design runs. In other words, current methodologies require that the top level end users and the design developers have intimate knowledge on both sides. Manually switching between multiple constraint files is also required to achieve the desired results.

Furthermore, current methodologies rely on custom files that may be different for different flow points. This results in many necessary files being separate from one another.

SUMMARY OF THE INVENTION

A method for using an out-of-context sub-block in a hierarchical design flow for an integrated circuit is disclosed. One embodiment of the method includes identifying one or more sub-blocks in the hierarchical design flow that are eligible for creating the out-of-context sub-block, receiving a selection of one of the one or more sub-blocks that are eligible and creating the out-of-context sub-block for the one of the one or more sub-blocks that is selected.

In various embodiments of the method the identifying comprises using location based analysis; the creating includes creating a block file set that includes all of the files that are dependent upon one or more blocks below the one of the one or more sub-blocks that is selected, creating a set of runs for the out-of-context sub-block, creating a checkpoint file for the out-of-context sub-block and creating a synthesis wrapper stub file for the out-of-context sub-block; the block file set includes one or more constraint files where when the out-of-context sub-block is implemented in the hierarchical design flow, a proper set of constraints is selected within a context of the hierarchical design flow; the method further includes inserting the checkpoint file into a second hierarchical design flow to reuse the out-of-context sub-block that was created from the hierarchical design flow, wherein the checkpoint file provides a necessary set of source files and a proper set of constraints within a context of the second hierarchical design flow; the method further includes changing one or more parameters within the out-of-context sub-block independent from the hierarchical design flow; the method further includes performing a run of the out-of-context sub-block independent from the hierarchical design flow; the method further includes receiving a second selection of a second one of the one or more sub-blocks, creating a second out-of-context sub-block for the second one of the one or more sub-blocks that are selected and performing a run of the out-of-context sub-block and the second out-of-context sub-block in parallel; wherein the selection is received from a graphical user interface; and wherein the selection is received from a command in a tool command language (Tcl).

According to another embodiment, a non-transitory computer-readable medium storing a plurality of instructions which, when executed by a processor, cause the processor to perform operations for using an out-of-context sub-block in a hierarchical design flow for an integrated circuit is provided. The operations of non-transitory computer readable medium includes identifying one or more sub-blocks in the hierarchical design flow that are eligible for creating the out-of-context sub-block, receiving a selection of one of the one or more sub-blocks that are eligible and creating the out-of-context sub-block for the one of the one or more sub-blocks that is selected.

In various embodiments of the operations of the non-transitory computer readable medium the identifying comprises using location based analysis; the creating includes creating a block file set that includes all of the files that are dependent upon one or more blocks below the one of the one or more sub-blocks that is selected, creating a set of runs for the out-of-context sub-block, creating a checkpoint file for the out-of-context sub-block and creating a synthesis wrapper stub file for the out-of-context sub-block; the block file set includes one or more constraint files where when the out-of-context sub-block is implemented in the hierarchical design flow, a proper set of constraints is selected within a context of the hierarchical design flow; the operations of the non-transitory computer readable medium further includes inserting the checkpoint file into a second hierarchical design flow to reuse the out-of-context sub-block that was created from the hierarchical design flow, wherein the checkpoint file provides a necessary set of source files and a proper set of constraints within a context of the second hierarchical design flow; the operations of the non-transitory computer readable medium further includes changing one or more parameters within the out-of-context sub-block independent from the hierarchical design flow; the operations of the non-transitory computer readable medium further includes performing a run of the out-of-context sub-block independent from the hierarchical design flow; the operations of the non-transitory computer readable medium further includes receiving a second selection of a second one of the one or more sub-blocks, creating a second out-of-context sub-block for the second one of the one or more sub-blocks that are selected and performing a run of the out-of-context sub-block and the second out-of-context sub-block in parallel; wherein the selection is received from a graphical user interface; and wherein the selection is received from a command in a tool command language (Tcl).

According to another embodiment, an apparatus includes a processor and a computer-readable medium storing a plurality of instructions which, when executed by the processor, cause the processor to perform operations. The operations include identifying one or more sub-blocks in the hierarchical design flow that are eligible for creating the out-of-context sub-block, receiving a selection of one of the one or more sub-blocks that are eligible and creating the out-of-context sub-block for the one of the one or more sub-blocks that is selected.

BRIEF DESCRIPTION OF THE DRAWINGS

Accompanying drawings show exemplary embodiments in accordance with one or more aspects of the disclosure; however, the accompanying drawings should not be taken to limit the disclosure to the embodiments shown, but are for explanation and understanding only.

To facilitate understanding, identical reference numerals have been used, where possible, to designate identical elements that are common to the figures.

DETAILED DESCRIPTION OF THE DRAWINGS

The present disclosure broadly discloses a method, non-transitory computer readable medium and apparatus for creating and reusing out-of-context (OOC) sub-blocks in a hierarchical design flow for an integrated circuit, e.g., a field programmable gate array (FPGA), an application-specific integrated circuit (ASIC), and the like. As discussed above, designing integrated circuits such as field programmable gate arrays (FPGAs) is a complicated task. Often, a logical design for an FPGA may be very large in scope that may include many sub-level designs. The discussion below with reference to an FPGA is only illustrative to assist the reader in understanding the present disclosure and should not be interpreted as a limitation of the present disclosure.

Figure 1:
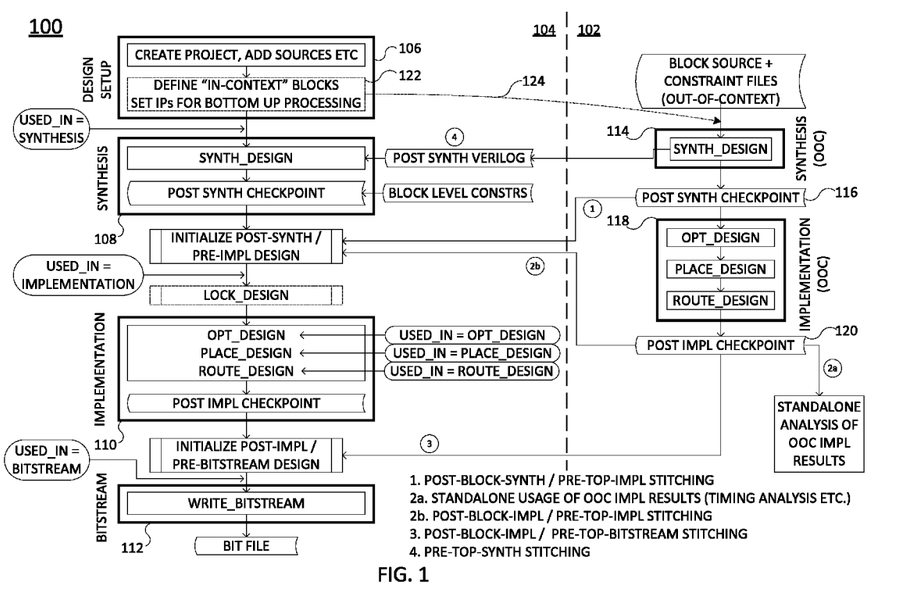
FIG. 1 illustrates one example block diagram of a hierarchical design flow.

Designing an FPGA may involve end users at a top level and third party programmers that may program sub-blocks at a lower or bottom level. FIG. 1 illustrates a block diagram of a hierarchical design flow 100. In one embodiment, the design flow 100 may include a bottom level 102 that may include, for example, third party programmers and a top level 104 that may include, for example, end users. Typical processing or programming stages or blocks for a top level hierarchical design may include a design setup stage 104, a synthesis stage 108, an implementation stage 110 and a bitstream 112 that is used to feed the FPGA with the appropriate programming logic. The bottom level 102 may include one or more sub-stages 114 and 118 and one or more associated checkpoint files 116 and 120. Further, the collection of 102, 114, 118 and 120 can be repeated as many times as needed for multiple sub-blocks The sub-blocks from independent bodies may be inserted at various points within the design setup stage 104, synthesis stage 108 and implementation stage 110 of the hierarchical design flow 100. These points may also be referred to as "stitching" points and are indicated by lines 1, 2b, 3 and 4.

Previous methods required that the top level end users and the third party programmers have an intimate knowledge of both sides of the flow. However, one embodiment of the present disclosure allows the end users at the top level 104 to create OOC sub-blocks within the top level 104 as illustrated by dashed line 124. The OOC sub-blocks may then be used by the bottom level 102 also illustrated by the dashed line 124. In addition, these OOC sub-blocks that are automatically created in the top level 104 may then be re-inserted into any subsequent hierarchical design at the top level 104 at any one of the stitching points 1-4 illustrated at FIG. 1. In other words, the OOC sub-blocks are created and used without the need to have an intimate knowledge of both the bottom level 102 and the top level 104.

In addition, previous methods required the sub-blocks to be manually inserted into the hierarchical design. This required a programmer to manually find the proper source files and file dependencies within the hierarchical design and know the context within which the hierarchical design is being built. Furthermore, the programmer was required to manually switch between multiple constraint files to achieve a desired result. This was a very complicated and laborious process that was inefficient and time consuming.

One embodiment of the present disclosure provides an automated process for producing out-of-context (OOC) sub-blocks from a hierarchical design that can then be reused easily for subsequent hierarchical designs at the top level 104. As a result, OOC sub-blocks of the hierarchical design may be de-coupled from the overall design allowing for independent changing and testing of the OOC sub-blocks from the top level hierarchical design. In addition, the OOC sub-blocks may be tested and run independently from one another in parallel. Furthermore, the OOC sub-blocks may be created such that they may be easily reused and inserted into top level 104 hierarchical designs that previously were not possible.

Figure 2:
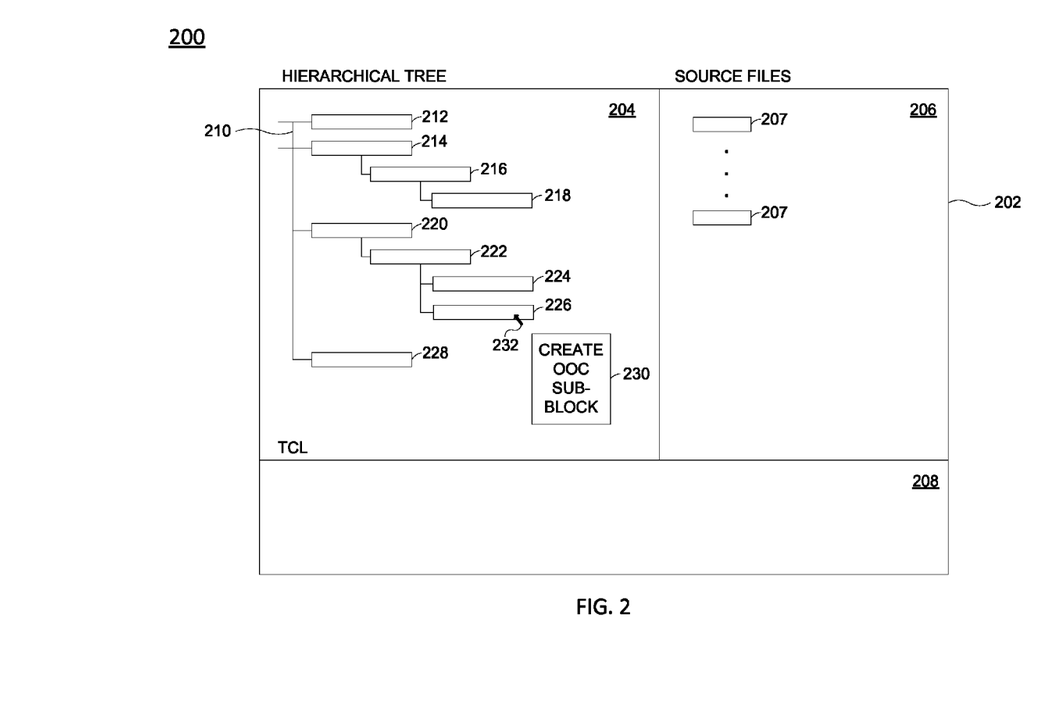
FIG. 2 illustrates one example of a hierarchical design flow displayed on a graphical user interface (GUI)
Figure 4:
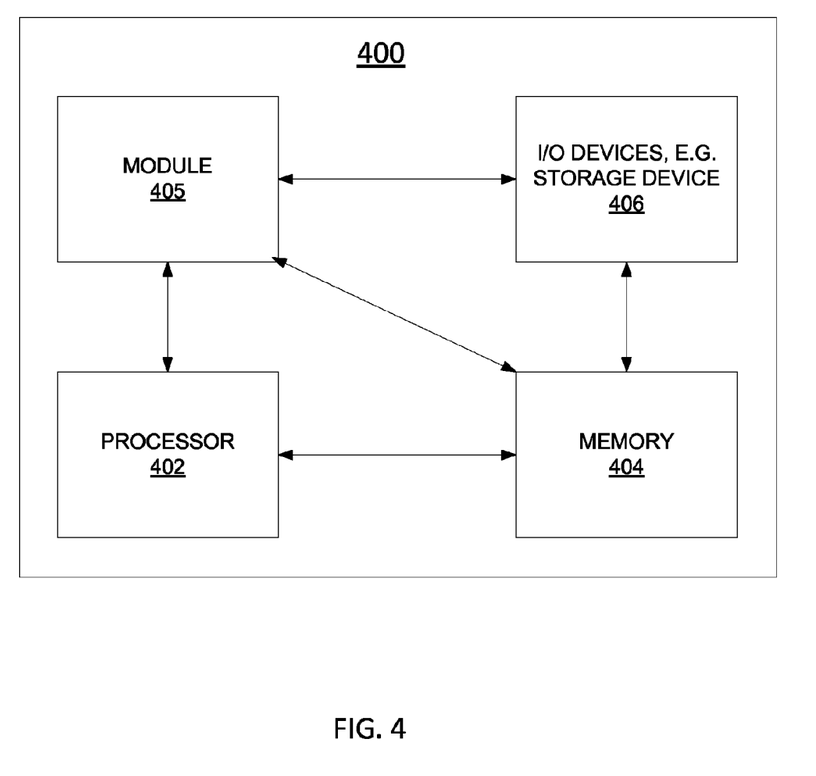
FIG. 4 illustrates a high-level block diagram of a general-purpose computer suitable for use in performing the functions described herein.

FIG. 2 illustrates an example graphical user interface (GUI) 200 of a program (broadly one or more software applications) used to design and produce the hierarchical design flows. In one embodiment, the GUI 200 may include a hierarchical tree window 204, a source file window 206 and a tool command language (Tcl) window 208. In one embodiment, the GUI 200 may be displayed and controlled by a general purpose computer as illustrated in FIG. 4 and discussed below.

In one embodiment, the hierarchical tree window 204 may include a visual layout of a hierarchical design flow 210. The hierarchical design flow 210 may include one or more blocks 212, 214, 220 and 228 and one or more associated sub-blocks 216, 218, 222, 224 and 226. Although a particular number of blocks and sub-blocks are illustrated, it should be noted that the hierarchical design flow 210 may include any number of blocks or sub-blocks (e.g., more or fewer blocks or sub-blocks). In one embodiment, the source file window 206 may list one or more source files that are associated with any one of the blocks or sub-blocks 212-228 that are selected.

In one embodiment, the Tcl window 208 may provide the same information as illustrated in the hierarchical design flow 210 but in a batch environment. For example, power users who are more comfortable with using Tcl in a batch environment, as opposed to a graphical point and click interface of the hierarchical tree window 204, may operate in the Tcl window 208. In one embodiment, the Tcl window 208 may also include one or more runs associated with each one of the blocks or sub-blocks 212-228 that are selected.

In one embodiment, any sub-block 216, 218, 222, 224 and 226 that is eligible to create an OOC sub-block may be identified. In one embodiment, a location based analysis may be performed to identify eligible sub-blocks 216, 218, 222, 224 and 226. For example, a sub-block located within an IP may not be eligible for creating an OOC sub-block or a block at a top level of the hierarchical design flow 210 may not be eligible for creating an OOC sub-block.

In one embodiment, location based analysis includes an analysis of the entire design vis-à-vis the portion of the sub-design within the OOC sub-block, with respect to the needs and usage of source files by the OOC sub-block. Thus, any co-dependencies are identified and any movement or sharing of source files between the top level design as well as the sub-block are decided upon such that both can be run through flows independent of each other. The source files are discussed in further detail below.

In one embodiment, an end user may know which sub-blocks 216, 218, 222, 224 and 226 are eligible to create an OOC sub-block by moving a cursor 232 over a sub-block and making a context selection on one of the sub-blocks 216, 218, 222, 224 and 226 in the GUI 200. In one embodiment, making a context selection may display a menu window 230 that includes an option to "create an OOC sub-block". If the sub-block that is selected is eligible, the option to "create an OOC sub-block" may be darkened in and be selectable. If the sub-block that is selected is not eligible, the option to "create an OOC sub-block" may be grayed out and not be selectable.

In one embodiment, the sub-blocks may be created using Tcl. That is a user may prefer to create the sub-blocks using the tool command language rather than making the context selections in the GUI 200.

Once a sub-block, e.g., sub-block 226, is selected to create an OOC sub-block, the program may automatically search up the hierarchical design flow 210 to find all the necessary files to create the OOC sub-block. As noted above, in previous methods this required a user to manually search each one of the blocks 212-228 of the hierarchical design 210 to find the necessary files. In contrast, one embodiment of the present disclosure automatically finds the necessary files to create a block file set, a set of runs or run files, a checkpoint file and a synthesis wrapper stub file.

In one embodiment, the block file set may include all of the files that are dependent upon one or more blocks below (or up) the hierarchical tree of the selected sub-block. The block file set may include one or more source files. The source files 207 may be displayed in the source file window 206.

In one embodiment, the block file set may also include one or more constraint files such that the OOC sub-block may automatically set the proper set of constraints depending on the context that the OOC sub-block is used. The context may refer to the relationship of the OOC sub-block to other blocks within a hierarchical design flow 210 or in isolation. By including the necessary constraint files, the program may set the proper constraints for the OOC sub-block whether it is implemented as part of a hierarchical design flow 210 or tested in isolation by itself.

As noted in FIG. 1 in the dashed box 122 and the dashed line 124, once the OOC sub-block is created, the OOC sub-block may become part of the bottom level 102 such that the OOC sub-block may be inserted into any design flow at the top level 104. In one embodiment, the checkpoint files may allow the OOC sub-block to be inserted at various points of the processing stages (e.g., the design setup stage 104, the synthesis stage 108, the implementation stage 110 and the bitstream stage 112).

In one embodiment, the checkpoint files may also include placement and routing information associated with the OOC sub-block regarding where in the top level 104 the OOC sub-block was inserted.

In one embodiment, the OOC sub-block may be optimized in a stand-alone analysis of the OOC sub-block illustrated by path 2a from the post implementation checkpoint 120. For example, when a third party IP vendor creates an OOC sub-block, the OOC sub-block must be run through an entire flow from synthesis to implementation to analyze the results of the OOC implementation to make sure timing is met and the design is as efficient as possible.

The stand-alone analysis of the OOC sub-block automatically fetches the proper constraints or constraint files from the original sources in the bottom level 102 and any OOC floor planning that was performed to perform the implementation and subsequent analysis of the OOC sub-block. In other words, the constraints or constraint files are not picked up from the top level 104 for the stand-alone analysis.

Alternatively, the OOC sub-blocks may be inserted at various points in the top level 104. The present disclosure allows usage of various "USED_IN" properties, shown on the left hand side of FIG. 1 to further automate this process of selecting a specific point in the top level 104 of the design flow, where the run results from the OOC sub-block may be re-inserted. In one embodiment, the USED_IN property may be used to tag different constraint files that are used by the OOC sub-blocks. For example, the OOC sub-blocks may include a regular constraint that is always used whether for when the OOC sub-block is used out of context or within context as part of a design. The OOC sub-block may also include an OOC constraint file (e.g., a global clock information that is provided only by the top level 104) when the OOC sub-block is implemented out-of-context.

Currently, a user is required to manually introduce the OOC constraints and ensure the OOC constraints are removed to/from the OOC sub-block depending on the context. However, the USED_IN property may properly tag the different types of constraint files such that the proper constraint file is automatically selected and the proper constraints within the context of the hierarchical design flow are set.

In one embodiment, the creation of the OOC sub-blocks within the hierarchical design flow 210 also allows the OOC sub-blocks to be de-coupled from the top level design. As a result, changes can be made to the OOC sub-block independent of the entire hierarchical design flow 210. In addition, if the OOC needs to be tested, the proper constraints may be set for the OOC sub-block and the run files may be executed independent of the entire hierarchical design flow 210. In other words, making changes to and testing the OOC sub-block does not require any modification to the entire hierarchical design flow 210.

Furthermore, if the hierarchical design flow 210 includes multiple OOC sub-blocks, each one of the multiple OOC sub-blocks may be tested and modified independently of one another. In contrast, previous methods would require the runs to be executed in serial down the hierarchical design flow 210. Thus, the creation of the OOC sub-blocks allows for faster and more efficient parallel processing and testing.

In one embodiment, the checkpoint file(s) that are automatically created allow an end user on the top level 104 to add the OOC sub-block in the hierarchical design 210 at the top level 104. The checkpoint file may be inserted into the hierarchical design 210 or any one of the stitching points 1-4 illustrated in FIG. 1. Once the checkpoint file is inserted all of the necessary files and run files will be incorporated into the hierarchical design 210. This was not possible in previous methods. This facilitates a more efficient reuse of intellectual property (IP) flows. In one embodiment, the checkpoint file(s) may also include one or more constraints that may also set a proper context use of the constraint depending on where the checkpoint is used in the hierarchical design flow.

For example, an end user may create a first hierarchical design at the top level 104. The end user may create one or more OOC sub-blocks from the first hierarchical design. Subsequently, the end user may create a second hierarchical design at the top level 104 and realize that he or she would like to reuse one of the OOC sub-blocks that were created in the first hierarchical design. In one embodiment, the user may simply insert the checkpoint file of the desired OOC sub-block into the second hierarchical design. For example, a new sub-block with the checkpoint file may be inserted into the hierarchical design 210 illustrated in the GUI 200.

In one embodiment, the synthesis wrapper stub file creates a placeholder in the top level 104 such that the OOC sub-block may be inserted into the top level 104. Previously, a user would be required to know exactly where sub-blocks would be inserted into the top level 104 and manually create the synthesis wrapper stub files. The top level 104 could not be synthesized without having the placeholder representation of the OOC sub-block.

In one embodiment, the synthesis wrapper stub file may contain an empty module definition with the correct interface/port mapping information. The synthesis wrapper stub file may be automatically generated and used when the OOC sub-block is created and inserted. In one embodiment, the synthesis wrapper stub file may be inside the checkpoint files.

In one embodiment, when the checkpoint files are joined into the top level 104, the checkpoint file may have the ability to automatically query for the synthesis wrapper stub files and use them in the top level 104. In one embodiment, if the user does not want to use the automated stub file handling, the automation may be turned off.

Thus, the present disclosure provides unified OOC flow and automation for IP reuse and hierarchical design flows. End users at a top level 104 and third party programmers at the bottom level 102 are no longer required to have an intimate knowledge of both the top level 104 and the bottom level 102. In one embodiment, OOC sub-blocks can be easily created and re-used in subsequent hierarchical design flows. In addition, changes and testing of OOC sub-blocks are more efficient as they are decoupled from the overall hierarchical design flow.

Figure 3:
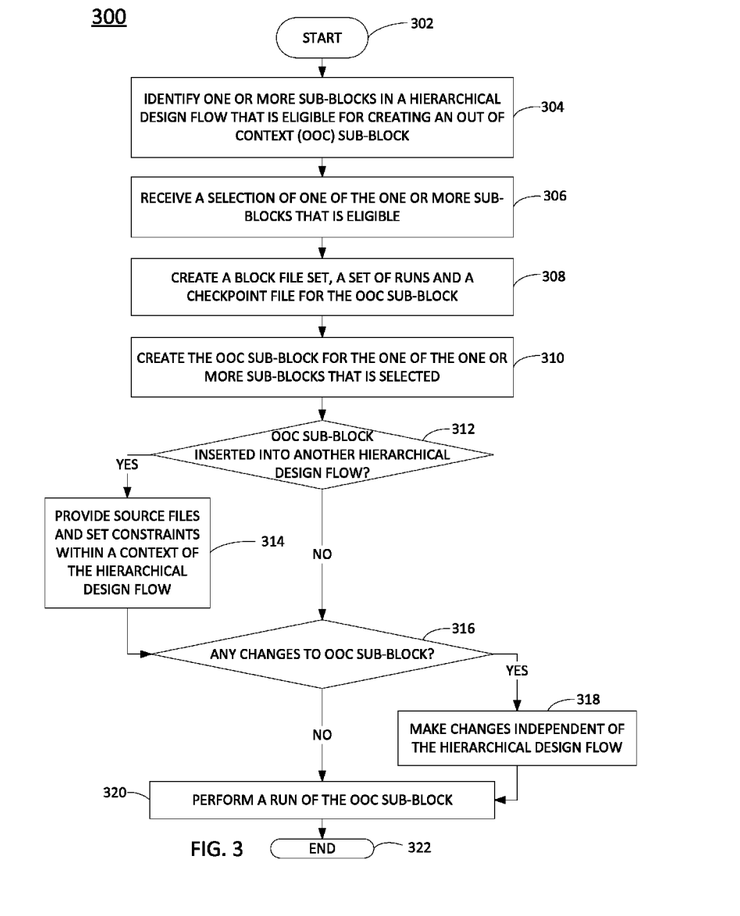
FIG. 3 illustrates an example flowchart of one embodiment of a method for creating and reusing out-of-context (OOC) sub-blocks in a hierarchical design flow for an integrated circuit, e.g., a field programmable gate array (FPGA)

FIG. 3 illustrates a flowchart of a method 300 for creating and reusing OOC sub-blocks in a hierarchical design flow for a FPGA. In one embodiment, the method 300 may be performed by a general purpose computer (or any other hardware equivalent device) as illustrated in FIG. 4, and discussed below.

The method 300 begins at step 302. At step 304, the method 300 identifies one or more sub-blocks in a hierarchical design flow that is eligible for creating an OOC sub-block. For example, using a location based analysis within the hierarchical design flow the program may determine one or more sub-blocks that are eligible for creating an OOC sub-block.

At step 306, the method 300 receives a selection of one of the one or more sub-blocks that is eligible. For example, the user may right click on a sub-block on the GUI. If the sub-block is eligible for creating an OOC sub-block, then a menu item to create the OOC sub-block may be provided to the user and selected by the user. If the sub-block is not eligible, the menu item to create the OOC sub-block may be grayed out so that it cannot be selected or simply not presented. In another embodiment, if the user is a more sophisticated programmer, the user may provide a selection via a Tcl command in a batch environment.

At step 308, the method 300 creates a block file set, a set of runs and a checkpoint file for the OOC sub-block that is to be created. In one embodiment, the program may automatically search up the hierarchical design flow to find all of the necessary files to create the OOC sub-block. This may include all of the files that are dependent upon one or more blocks below (or up) the hierarchical tree of the selected sub-block.

The block file set may include one or more source files and one or more constraint files. In one embodiment, the block file set may include multiple constraint files to ensure that the OOC sub-block may operate within any hierarchical design flow. In other words, even though the OOC sub-block was created without knowledge of a particular hierarchical design flow, the OOC sub-block will have the proper constraint files to set the proper constraints within the context of the hierarchical design flow that the OOC sub-block is inserted into. In one embodiment, the proper constraint file may be selected and the proper constraints may be set by the "USED_IN" property described above.

At step 310, the method 300 creates the OOC sub-block for the one of the one or more sub-blocks that is selected. For example, the OOC sub-block may be defined as a collection of files. For example, the collection of files may be the block file set, the set of runs and the checkpoint file that was created in step 308.

In one embodiment, the OOC sub-block is created out of context by an end user at the top level. In other words, the OOC sub-block was not created by a third party programmer at a bottom level that had intimate knowledge of the hierarchical design from which the OOC sub-block was created.

In one embodiment, the steps 306, 308 and 310 may be repeated for as many OOC sub-blocks that are desired by the user. In other words, a plurality of OOC sub-blocks may be created from a single hierarchical design flow.

At step 312, the method 300 determines if the OOC sub-block is inserted into another hierarchical design flow. In other words, a second hierarchical design flow may be created and the OOC sub-block that was created at a top level in a previous hierarchical design flow may be inserted into the second design flow. Again, it should be noted that the OOC sub-block was created out of context because the OOC sub-block was created without any knowledge of the existence of the second hierarchical design flow that was created. Regardless, the OOC sub-block is created such that the OOC sub-block may be reused in the second hierarchical design flow.

In one embodiment, the OOC sub-blocks may be created at a bottom level. In other words, the available OOC sub-blocks may have been created automatically from a top level hierarchical design, out of context at a bottom level by third party programmers or both.

If the answer to step 312 is yes or affirmative, the method 300 may proceed to step 314. At step 314, the method 300 provides source files and sets one or more constraints within a context of the second hierarchical design flow. For example, in operation when the OOC sub-block is created, the checkpoint file that was created in the step 308 may be inserted into the desired point of the second hierarchical design. The checkpoint file may then provide the proper block file set that includes the source files, constraint files and run files. The proper constraint file may be selected and the proper constraints may be set to operate within the context of the second hierarchical design. The method 300 may then proceed to step 316.

Referring back to step 312, if the answer to step 312 is no or negative, then the method 300 may proceed to step 316. At step 316, the method 300 determines if any changes are made to the OOC sub-block. In one embodiment, the OOC sub-blocks are created such that they are de-coupled from the hierarchical design flow. As a result, any changes made to the OOC sub-block can be made independent from the overall hierarchical design flow and other OOC sub-blocks. In other words, a change to the OOC sub-block may not require any changes to the hierarchical design flow or any other OOC sub-block.

If the answer to step 316 is yes or affirmative, the method 300 may proceed to step 318. At step 318, the method 300 makes changes to the OOC sub-block independent of the hierarchical design flow. The method 300 may then proceed to step 320.

Referring back to step 316, if the answer to step 316 is no, then the method 300 may proceed to step 320. At step 320, the method 300 may perform a run of the OOC sub-block. In one embodiment, if multiple OOC sub-blocks are created, then the OOC sub-blocks may execute the run files in parallel.

In addition, each one of the OOC sub-blocks may execute the run files independently from the overall hierarchical design flow. In other words, the run files for each one of the blocks in the hierarchical design flow does not need to be executed in serial to execute the run file of the OOC sub-block (s). As a result, overall design and testing of the hierarchical design flow may be more efficient. The method 300 ends at step 322.

In one embodiment, the method 300 may be modified such that the method begins with an OOC sub-block being inserted into a hierarchical design flow. In other words, if the OOC sub-block is already created a complete method independent of the method 300 may include inserting the OOC sub-block into a hierarchical design flow and then performing steps 314, 316, 318, 320 and 322 similarly as performed in the method 300.

It should be noted that although not explicitly specified, one or more steps, blocks, or functions of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, blocks, or functions in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a hardware processor element 402 (e.g., a CPU), a memory 404, e.g., random access memory (RAM) and/or read only memory (ROM), a module 405 for creating and reusing OOC sub-blocks in a hierarchical design flow for an IC, e.g., an FPGA and the like, and various input/output devices 406, e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps or functions of the above disclosed method. In one embodiment, the present module or process 405 for creating and reusing OOC sub-blocks in a hierarchical design flow for an IC, e.g., an FPGA can be loaded into memory 404 and executed by hardware processor 402 to implement the functions as discussed above. As such, the present process 405 for creating and reusing OOC sub-blocks in a hierarchical design flow for an IC, e.g., an FPGA as discussed above in method 300 (including associated data structures) of the present disclosure can be stored on a non-transitory (e.g., tangible or physical) computer readable storage medium, e.g., RAM memory, magnetic or optical drive or diskette and the like.

While the foregoing describes exemplary embodiments in accordance with one or more aspects of the present disclosure, other and further embodiments in accordance with the one or more aspects of the present disclosure may be devised without departing from the scope thereof, which is determined by the claims that follow and equivalents thereof. Claims listing steps do not imply any order of the steps. Trademarks are the property of their respective owners.

What is claimed is:

1. A method for using an out-of-context sub-block in a hierarchical design flow for an integrated circuit, comprising:
   identifying, by a processor, one or more sub-blocks in the hierarchical design flow that are eligible for creating the out-of-context sub-block;
   receiving, by the processor, a selection of one of the one or more sub-blocks that are eligible; and
   creating, by the processor, the out-of-context sub-block for the one of the one or more sub-blocks that is selected, wherein the out-of-context sub-block is decoupled from, and independent of, the hierarchical design flow.

2. The method of claim 1, wherein the out-of-context sub-block originates from the hierarchical design flow, the method further comprising:
   testing, by the processor, the out-of-context sub-block independent of the hierarchical design flow.

3. The method of claim 1, wherein the creating comprises:
   creating, by the processor, a block file set that includes all of the files that are dependent upon one or more blocks below the one of the one or more sub-blocks that is selected;
   creating, by the processor, a set of runs for the out-of-context sub-block;
   creating, by the processor, a checkpoint file for the out-of-context sub-block; and
   creating, by the processor, a synthesis wrapper stub file for the out-of-context sub-block.

4. The method of claim 3, wherein the block file set includes one or more constraint files where when the out-of-context sub-block is implemented in the hierarchical design flow, a proper set of constraints is selected within a context of the hierarchical design flow.

5. The method of claim 3, further comprising:
   inserting, by the processor, the checkpoint file into a second hierarchical design flow to reuse the out-of-context sub-block that was created from the hierarchical design flow, wherein the checkpoint file provides a necessary set of source files and a proper set of constraints within a context of the second hierarchical design flow.

6. The method of claim 1, further comprising:
   changing one or more parameters within the out-of-context sub-block independent from the hierarchical design flow.

7. The method of claim 1, wherein the out-of-context sub-block originates from the hierarchical design flow, the method further comprising:
   running, by the processor, the out-of-context sub-block through a different hierarchical design flow independent from the hierarchical design flow that originated the out-of-context sub-block.

8. The method of claim 1, further comprising:
   receiving, by the processor, a second selection of a second one of the one or more sub-blocks;
   creating, by the processor, a second out-of-context sub-block for the second one of the one or more sub-blocks that are selected; and
   performing, by the processor, a run of the out-of-context sub-block and the second out-of-context sub-block in parallel.

9. The method of claim 1, wherein the selection is received from a graphical user interface.

10. The method of claim 1, wherein the selection is received from a command in a tool command language (Tcl).

11. A non-transitory computer-readable medium storing a plurality of instructions which, when executed by a processor, cause the processor to perform operations for using an out-of-context sub-block in a hierarchical design flow for an integrated circuit, the operations comprising:
   identifying one or more sub-blocks in the hierarchical design flow that are eligible for creating the out-of-context sub-block;
   receiving a selection of one of the one or more sub-blocks that are eligible; and
   creating the out-of-context sub-block for the one of the one or more sub-blocks that is selected, wherein the out-of-context sub-block is decoupled from, and independent of, the hierarchical design flow.

12. The non-transitory computer-readable medium of claim 11, wherein the out-of-context sub-block originates from the hierarchical design flow, the operations further comprising:
   testing the out-of-context sub-block independent of the hierarchical design flow.

13. The non-transitory computer-readable medium of claim 11, wherein the creating comprises:
   creating a block file set that includes all of the files that are dependent upon one or more blocks below the one of the one or more sub-blocks that is selected;
   creating a set of runs for the out-of-context sub-block;
   creating a checkpoint file for the out-of-context sub-block; and
   creating a synthesis wrapper stub file for the out-of-context sub-block.

14. The non-transitory computer-readable medium of claim 13, wherein the block file set includes one or more constraint files where when the out-of-context sub-block is implemented in the hierarchical design flow, a proper set of constraints is selected within a context of the hierarchical design flow.

15. The non-transitory computer-readable medium of claim 13, further comprising:
   inserting the checkpoint file into a second hierarchical design flow to reuse the out-of-context sub-block that was created from the hierarchical design flow, wherein the checkpoint file provides a necessary set of source files and a proper set of constraints within a context of the second hierarchical design flow.

16. The non-transitory computer-readable medium of claim 11, further comprising:
   changing one or more parameters within the out-of-context sub-block independent from the hierarchical design flow.

17. The non-transitory computer-readable medium of claim 11, wherein the out-of-context sub-block originates from the hierarchical design flow, the operations further comprising:
   running the out-of-context sub-block through a different hierarchical design flow independent from the hierarchical design flow that originated the out-of-context sub-block.

18. The non-transitory computer-readable medium of claim 11, further comprising:
   receiving a second selection of a second one of the one or more sub-blocks;
   creating a second out-of-context sub-block for the second one of the one or more sub-blocks that are selected; and
   performing a run of the out-of-context sub-block and the second out-of-context sub-block in parallel.

19. The non-transitory computer-readable medium of claim 11, wherein the selection is received from a graphical user interface or a command in a tool command language (Tcl).

20. An apparatus for using an out-of-context sub-block in a hierarchical design flow for an integrated circuit, comprising:
   a processor; and
   a computer-readable medium storing a plurality of instructions which, when executed by the processor, cause the processor to perform operations, the operations comprising:
   identifying one or more sub-blocks in the hierarchical design flow that are eligible for creating the out-of-context sub-block;
   receiving a selection of one of the one or more sub-blocks that are eligible; and
   creating the out-of-context sub-block for the one of the one or more sub-blocks that is selected, wherein the out-of-context sub-block is decoupled from, and independent of, the hierarchical design flow.

\* \* \* \* \*